United States Patent
Ljubuncic et al.

(10) Patent No.: US 9,684,364 B2
(45) Date of Patent: Jun. 20, 2017

(54) TECHNOLOGIES FOR OUT-OF-BAND POWER-BASED TASK SCHEDULING FOR DATA CENTERS

(71) Applicant: Intel Corporation, Santa Clara, CA (US)

(72) Inventors: Igor Ljubuncic, Yokneam Ilit (IL); Raphael Sack, Mitzpe Amuka (IL)

(73) Assignee: Intel Corporation, Santa Clara, CA (US)

( * ) Notice: Subject to any disclaimer, the term of this patent is extended or adjusted under 35 U.S.C. 154(b) by 57 days.

(21) Appl. No.: 14/564,341

(22) Filed: Dec. 9, 2014

(65) Prior Publication Data
US 2016/0162004 A1    Jun. 9, 2016

(51) Int. Cl.
*G06F 1/32*     (2006.01)
*G06F 9/50*     (2006.01)

(52) U.S. Cl.
CPC ............ *G06F 1/329* (2013.01); *G06F 1/3228* (2013.01); *G06F 9/5083* (2013.01); *Y02B 60/142* (2013.01); *Y02B 60/144* (2013.01); *Y02B 60/167* (2013.01)

(58) Field of Classification Search
CPC ...... G06F 1/329; G06F 1/3228; G06F 9/5083; Y02B 60/144; Y02B 60/167; Y02B 60/142
See application file for complete search history.

(56) References Cited

U.S. PATENT DOCUMENTS

| | | | |
|---|---|---|---|
| 8,850,027 B2* | 9/2014 | Srinivas | G06F 9/5044 345/503 |
| 9,104,412 B2* | 8/2015 | Lynar | G06F 1/329 |
| 2011/0231469 A1* | 9/2011 | Wolman | G06F 9/5094 709/201 |
| 2014/0055464 A1* | 2/2014 | Srinivas | G06F 9/5044 345/502 |
| 2014/0189389 A1* | 7/2014 | Lynar | G06F 1/329 713/320 |

* cited by examiner

*Primary Examiner* — M Elamin
(74) *Attorney, Agent, or Firm* — Barnes & Thornburg LLP (57) ABSTRACT

Technologies for data center power management include a number of computing nodes in communication over a network. Each computing node establishes a firmware environment that monitors power consumption of the computing node and if the power consumption exceeds an optimal level broadcasts a request to offload tasks to the other nodes. The firmware environment of a receiving computing node traps the request and determines power requirements and/or compute requirements for the tasks based on the request. The firmware environment determines whether to accept the offloaded task based on the requirements and available resources of the computing node. If accepted, the requesting computing node offloads one or more tasks to the receiving nodes. The firmware environment may be established by a manageability engine of the computing node. Power consumption may be monitored on a per-component basis. Compute requirements may include processor requirements or other requirements. Other embodiments are described and claimed.

24 Claims, 4 Drawing Sheets

TECHNOLOGIES FOR OUT-OF-BAND POWER-BASED TASK SCHEDULING FOR DATA CENTERS

BACKGROUND

For data centers, power consumption and thermal efficiency are major contributors to overall utilization and efficiency. In typical data centers, scheduling of computational work is performed along two major axes: power and compute. Power-based management is typically performed on a chassis/enclosure/rack level. Power considerations are typically made in advance, for example during build-out of the data center. Power is typically managed on a per-host level indirectly using hardware and/or firmware features (e.g., frequency scaling, sleep states, etc.) In contrast, processor, memory, storage, I/O, or other compute resource scheduling is typically performed on the system or data center level, sometimes using a centralized batch/grid/cloud scheduler entity. Compute-resource scheduling may be performed dynamically, for example using operating system metrics. Certain third party products may provide centralized monitoring of operating-system-level usage metrics for a data center.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one of A, B, and C" can mean (A); (B); (C): (A and B); (A and C); (B and C); or (A, B, and C). Similarly, items listed in the form of "at least one of A, B, or C" can mean (A); (B); (C): (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on one or more transitory or non-transitory machine-readable (e.g., computer-readable) storage media, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Figure 1:
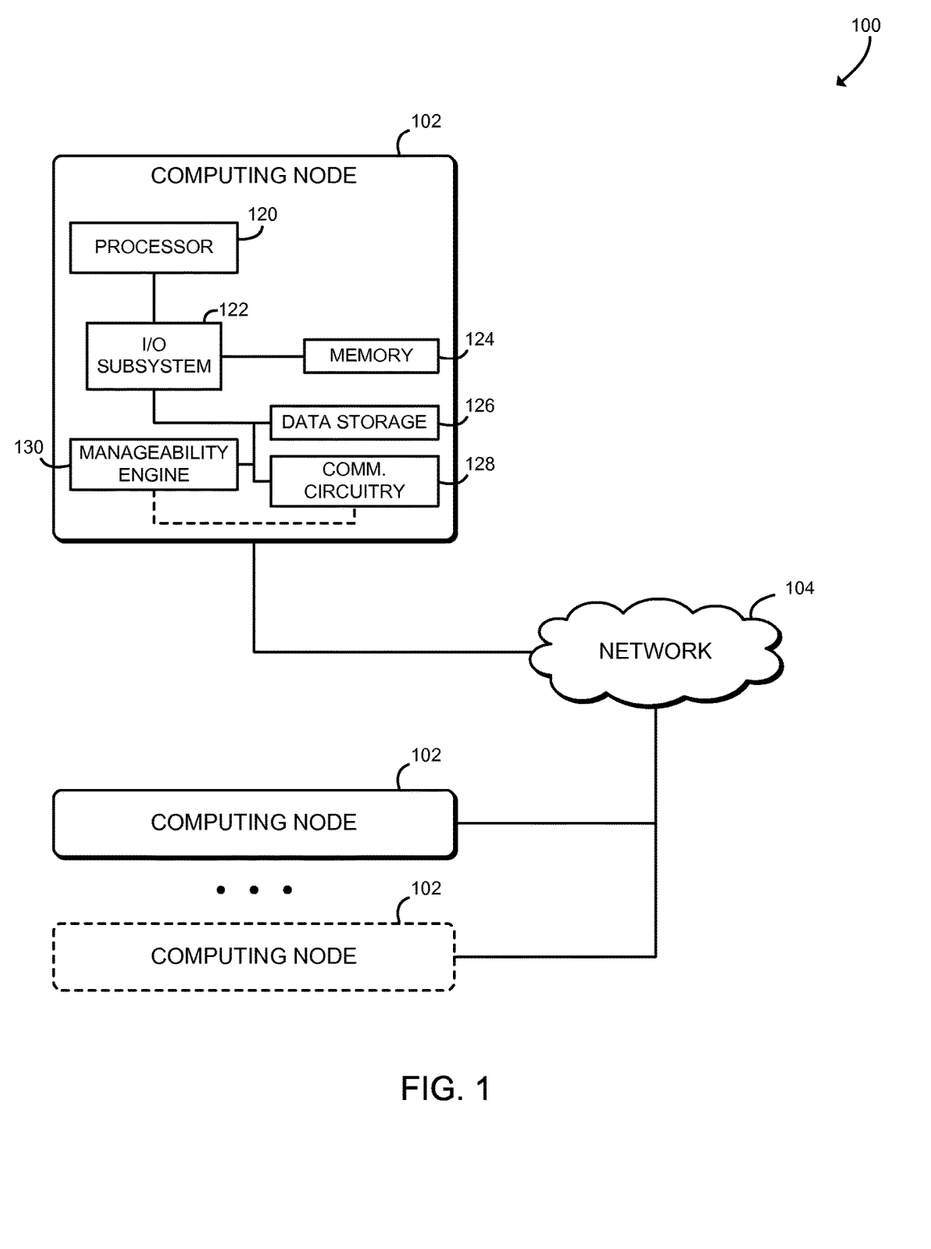
FIG. 1 is a simplified block diagram of at least one embodiment of a system for power-based task scheduling.

Referring now to FIG. 1, in an illustrative embodiment, a system 100 for power-based task scheduling includes two or more computing nodes 102 in communication over a network 104. In use, as discussed in more detail below, each computing node 102 may execute one or more tasks, such as applications, scripts, jobs, or other workloads. A firmware environment of each computing node 102 monitors power consumption of the corresponding computing node 102 and, if the power consumption exceeds an optimal level, may broadcast a request to offload a task to other, remote computing nodes 102 in the system 100 via the network 104. The offload task request may include, for example, the power requirements for the offloaded task as well as one or more compute requirements (such as processor requirements, memory requirements storage requirements, and/or I/O requirements). The firmware environment of the remote computing nodes 102 may trap the offload task request and determine whether to accept the offloaded task based on the requirements of the request and the available power and compute resources of the corresponding remote computing node 102. Thus, the tasks may be distributed among the computing nodes 102 of the system 100 based on real-time power consumption data and on computational utilization metrics, using firmware capabilities of the computing nodes 102. The system 100 may improve power efficiency and/or utilization of a data center by scheduling tasks based on both power consumption and computational utilization across the data center. Additionally, the system 100 may perform task scheduling using native hardware and firmware resources of the computing nodes 102, without requiring specialized operating system tools or third-party tools. Thus task scheduling may not be restricted to computing nodes 102 produced by any specific vendor. Additionally or alternatively, although illustrated as performing decentralized scheduling among multiple computing nodes 102, in some embodiments the system 100 may include a centralized manager to similarly schedule tasks among the computing nodes 102.

Each computing node 102 may be embodied as any type of computation or computer device capable of performing the functions described herein, including, without limitation, a computer, a multiprocessor system, a server, a rack-mounted server, a blade server, a laptop computer, a notebook computer, a network appliance, a web appliance, a distributed computing system, a processor-based system, and/or a consumer electronic device. As shown in FIG. 1, each computing node 102 illustratively includes a processor 120, an input/output subsystem 122, a memory 124, a data storage device 126, and communication circuitry 128. Of course, the computing node 102 may include other or additional components, such as those commonly found in a server device (e.g., various input/output devices), in other embodiments. Additionally, in some embodiments, one or more of the illustrative components may be incorporated in, or otherwise form a portion of, another component. For example, the memory 124, or portions thereof, may be incorporated in one or more processor 120 in some embodiments.

The processor 120 may be embodied as any type of processor capable of performing the functions described herein. For example, the processor 120 may be embodied as a single or multi-core processor(s), digital signal processor, microcontroller, or other processor or processing/controlling circuit. Similarly, the memory 124 may be embodied as any type of volatile or non-volatile memory or data storage capable of performing the functions described herein. In operation, the memory 124 may store various data and software used during operation of the computing node 102 such as operating systems, applications, programs, libraries, and drivers. The memory 124 is communicatively coupled to the processor 120 via the I/O subsystem 122, which may be embodied as circuitry and/or components to facilitate input/output operations with the processor 120, the memory 124, and other components of the computing node 102. For example, the I/O subsystem 122 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 122 may form a portion of a system-on-a-chip (SoC) and be incorporated, along with the processors 120, the memory 124, and other components of the computing node 102, on a single integrated circuit chip.

The data storage device 126 may be embodied as any type of device or devices configured for short-term or long-term storage of data such as, for example, memory devices and circuits, memory cards, hard disk drives, solid-state drives, or other data storage devices. The data storage device 126 may store operating system or application data used to execute one or more tasks on the computing node 102. Additionally, in some embodiments, the data storage device 126 may include a firmware volume or other storage location including or establishing a firmware environment, such as a UEFI firmware partition.

The communication circuitry 128 of the computing node 102 may be embodied as any communication circuit, device, or collection thereof, capable of enabling communications between the computing nodes 102 and/or other remote devices over the network 104. The communication circuitry 128 may be configured to use any one or more communication technology (e.g., wired or wireless communications) and associated protocols (e.g., InfiniBand®, Ethernet, Bluetooth®, Wi-Fi®, WiMAX, etc.) to effect such communication. The communication circuitry 128 may include one or more network adapters and/or network ports that may be used concurrently to transfer data over the network 104.

In some embodiments, the computing node 102 may include a manageability engine 130. The manageability engine 130 is embodied as a device that provides remote configuration, control, and/or management of the computing node 102. The manageability engine 130 may include an out-of-band processor, which may be embodied as a processor, microcontroller, or other control circuit separate and distinct from the main processor 120 of the computing node 102. As such, the manageability engine 130 is capable of operating independently of the state of the rest of the computing node 102. That is, the manageability engine 130 is capable of operating regardless of the operating state of the processor 120, including when the computing node 102 is powered off, when the computing node 102 is executing a pre-boot firmware environment, when an operating system of the computing node 102 is active, and when the operating system is crashed or otherwise inactive. The manageability engine 130 may establish a firmware environment that is separate and distinct from the software environment established by the processor 120. The manageability engine 130 is also capable of communicating using the communication circuitry 128 independently of the state of the computing node 102, also known as "out-of-band" communication. In some embodiments, the manageability engine 130 may include a dedicated network adaptor for such out-of-band communication, in addition to, or instead of, connecting via the communication circuitry 128. In some embodiments, the manageability engine 130 may be incorporated into or otherwise form a part of the I/O subsystem 122.

As discussed in more detail below, the computing nodes 102 may be configured to transmit and receive data with each other and/or other devices of the system 100 over the network 104. The network 104 may be embodied as any number of various wired and/or wireless networks. For example, the network 104 may be embodied as, or otherwise include, a switched fabric network, a wired or wireless local area network (LAN), a wired or wireless wide area network (WAN), a cellular network, and/or a publicly-accessible, global network such as the Internet. As such, the network 104 may include any number of additional devices, such as additional computers, routers, and switches, to facilitate communications among the devices of the system 100.

Figure 2:
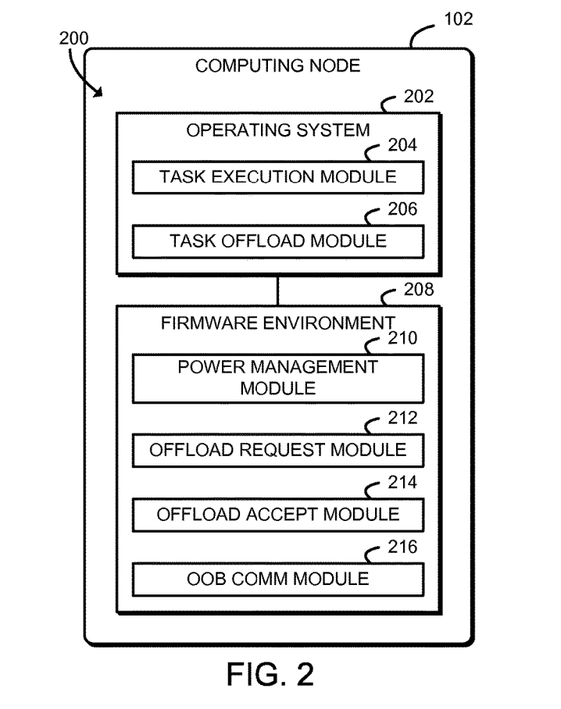
FIG. 2 is a simplified block diagram of at least one embodiment of an environment that may be established by a computing node of FIG. 1.

Referring now to FIG. 2, in an illustrative embodiment, each computing node 102 may establish an environment 200 during operation. The illustrative environment 200 includes an operating system 202 and a firmware environment 208. The operating system 202 establishes a task execution module 204 and a task offload module 206, and the firmware environment 208 establishes a power management module 210, an offload request module 212, an offload accept module 214, and an out-of-band (OOB) communications module 216. The various modules of the environment 200 may be embodied as hardware, firmware, software, or a combination thereof. For example, each of the modules, logic, and other components of the environment 200 may form a portion of, or otherwise be established by, the processor 120, the manageability engine 130, or other hardware components of the computing node 102. As such, in some embodiments, one or more of the modules of the environment 200 may be embodied as a circuit or collection of electrical devices (e.g., a task execution circuit, a task offload circuit, a power management circuit, etc.).

The operating system 202 may be embodied as any operating system, virtual machine monitor, hypervisor, or other control structure of the computing node 102. For example, the operating system 202 may be embodied as Microsoft® Windows™ or Linux®. The operating system 202 may execute and otherwise manage applications, processes, and other compute jobs on the computing node 102. The operating system 202 may also provide dynamic usage information of the computing node 102, such as processor usage, memory usage, storage usage, or I/O usage. The usage information may be provided for the computing node 102 as a whole, on a per-task or per-job basis, or in any other manner. As described above, the operating system 202 may establish the task execution module 204 and the task offload module 206.

The task execution module 204 is configured to execute one or more tasks within the operating system 202. Each task may be embodied as any application, script, job, or other workload to be executed by the computing node 102. The task execution module 204 may establish a queue or other structure to store and organize the tasks prior to executing them.

The task offload module 206 is configured to offload one or more tasks to a remote computing node 102 to be executed, and to execute offloaded tasks accepted from a remote computing device 102. For example, the computing node 102 may coordinate with the task execution module 204 to add and/or remove tasks to be executed by the computing node 102, and may transmit and/or receive tasks with remote computing nodes 102. The task offload module 206 may offload and/or receive tasks in response to commands received from the firmware environment 208, for example from the offload request module 212 and/or the offload accept module 214, as further described below.

The firmware environment 208 may be embodied as any execution environment of the computing node 102 that is independent of the operating system 202. For example, the firmware environment 208 may be established by the manageability engine 130 and/or by the processor 120. The firmware environment 208 is typically at a lower level of abstraction or otherwise has closer access to hardware of the computing node 102, compared to the operating system 202. The operating system 202 may interact with the firmware environment 208 through one or more operating system drivers. For example, the operating system 202 may use an operating system driver to interact with a UEFI BIOS of the computing node 102. The UEFI BIOS may establish the firmware environment 208 and/or may communicate with the firmware environment 208 established by the manageability engine 130. As the firmware environment 208 is independent of the operating system 202, some or all operations performed by modules of the firmware environment 208 may be performed without involvement of the operating system 202.

The power management module 210 is configured to determine the current power consumption of the computing node 102 and determine whether the power consumption exceeds an optimal level. For example, the power management module 210 may compare the current power consumption of the computing node 102 to a threshold power consumption level. The power management module 210 may monitor the current power consumption of individual components of the computing node 102, such as the processor 120, the memory 124, the data storage device 126, and/or the communication circuitry 128.

The offload request module 212 is configured to broadcast, using an out-of-band communication facility, an offload task request to a defined network environment after determining that the current power consumption of the computing node 102 exceeds the optimal level. The offload request module 212 is also configured to determine a power requirement for a task to be offloaded when the power consumption of the computing node 102 exceeds the optimal level. The offload request module 212 may also determine one or more compute requirements for the task to be offloaded in addition to the power requirements, for example using operating system 202 metrics associated with the task. The offload task requirements are included in the offload task request broadcast to the remote computing nodes 102. The offload request module 212 may cause the operating system 202 to offload a task in response to receiving a task acceptance from a remote computing device 102. For example, the offload request module 212 may transmit a command from the firmware environment 208 to the operating system 202. The offload task request may be broadcast to one or more remote computing nodes 102 that each also include the offload accept module 214.

The offload accept module 214 is configured to receive an offload task request from a remote computing node 102 and determine a power requirement and any compute requirements associated with the offload task request. The offload accept module 214 is configured to determine whether to accept the offload task request based on the requirements of offload task request and on available resources of the computing node 102 (including power resources and/or compute resources). The offload accept module 214 is configured to transmit an offload task acceptance to the remote computing node 102 and to receive an offloaded task from the remote computing node 102 in return.

The OOB communications module 216 is configured to transmit and receive data using an out-of-band communication facility, such as an out-of-band network capability of the manageability engine 130. The OOB communications module 216 may transmit and/or receive task offload requests, task offload acceptances, offloaded tasks, and/or other data with one or more remote computing nodes 102.

Figure 3:
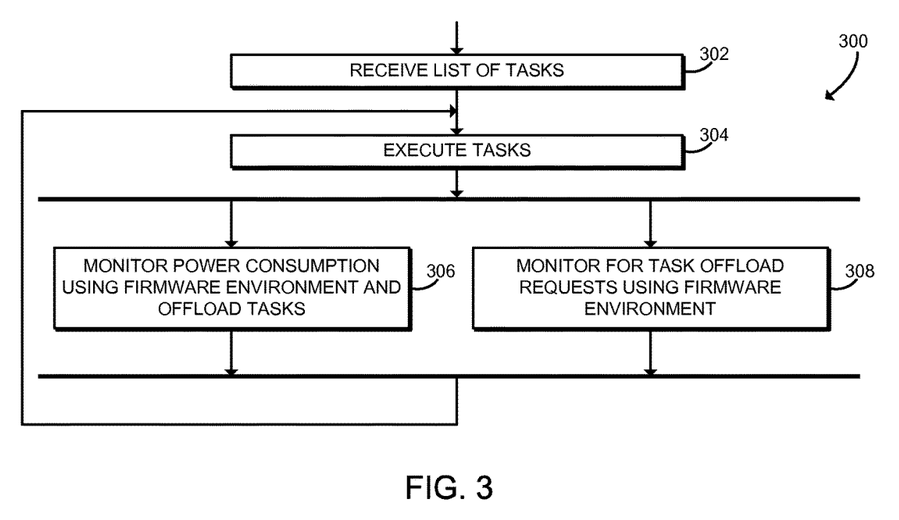
FIG. 3 is a simplified flow diagram of at least one embodiment of a method for power-based task scheduling that may be executed by the computing node of FIGS. 1 and 2.

Referring now to FIG. 3, in use, each computing node 102 may execute a method 300 for power-based task scheduling. The method 300 begins with block 302, in which the computing node 102 receives a list of tasks to be executed. Each task may be embodied as any application, script, job, or other workload to be executed by the computing node 102. The list of tasks may be generated or otherwise submitted by a data center manager, cloud operating system, system administrator, or any other source. It should be noted that in some embodiments, the list of tasks may be submitted to any computing node 102 in a data center, and during execution the tasks may be distributed within the data center as described below.

In block 304, the computing node 102 begins executing the tasks previously received. The computing node 102 may execute the tasks, for example, by executing one or more applications, processes, scripts, jobs, or other programs within the operating system 202. After starting to execute the tasks, the method 300 proceeds concurrently to block 306, 308. While executing blocks 306, 308, the computing node 102 may continue to execute one or more of the tasks.

In block 306, the computing node 102 monitors power consumption of the computing node 102 using the firmware environment 208 and may offload one or more tasks to remote computing nodes 102. The computing node 102 may offload tasks, for example, if the current power consumption of the computing node 102 exceeds a predefined threshold. The power consumption monitoring and task offloading performed by the firmware environment 208 may be transparent to the operating system 202 and/or to the tasks executed by the operating system 202. One embodiment of a method for monitoring power consumption and offloading tasks is described below in connection with FIG. 4.

In block 308, the computing node 102 monitors for task offload requests received from remote computing nodes 102 using the firmware environment 208. The computing node 102 may evaluate the offload requests to determine if power resources and/or compute resources are available to execute the offloaded task. If so, the computing node 102 may accept the offloaded task for execution. One embodiment of a method for accepting offloaded tasks is described below in connection with FIG. 5.

After executing blocks 306, 308, the method 300 loops back to block 304 to continue executing tasks. The computing node 102 may start executing offloaded tasks received from remote computing nodes 102, and may stop executing tasks that have been offloaded to remote computing nodes 102. Additionally, although illustrated as performing the blocks 306, 308 concurrently and then looping back to block 304, it should be understood that in some embodiments the computing node 102 may perform those operations in any order including concurrently, sequentially, continually, periodically, or in an interleaved manner. For example, the blocks 306, 308 may be executed by the manageability engine 130 concurrently with the block 304 executed by the processor 120.

Figure 4:
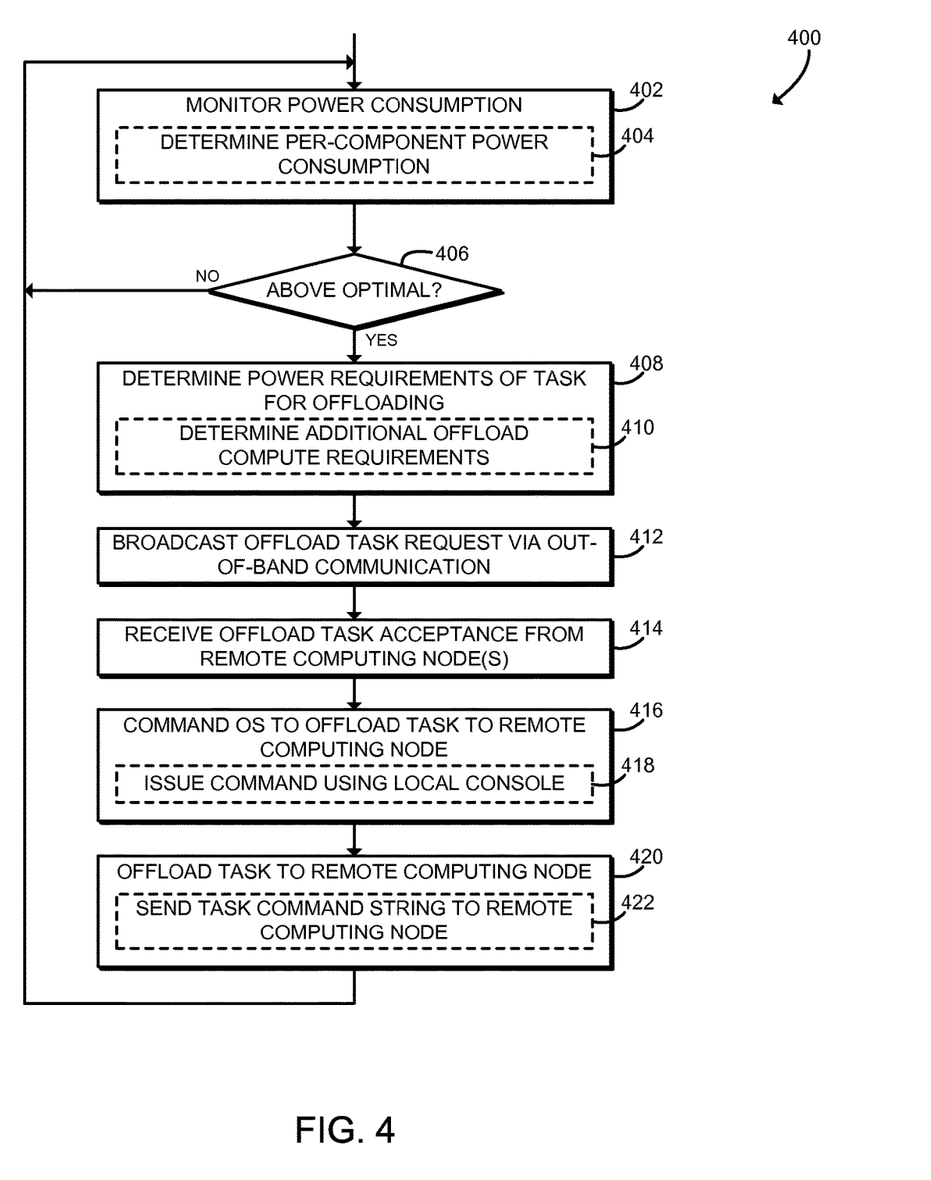
FIG. 4 is a simplified flow diagram of at least one embodiment of a method for offloading tasks that may be executed by the computing node of FIGS. 1 and 2.

Referring now to FIG. 4, in use, each computing node 102 may execute a method 400 for monitoring power consumption and offloading tasks. The method 400 is executed by the firmware environment 208; for example by the processor 120 in a UEFI BIOS firmware environment, by the manageability engine 130, or by any other firmware component of the computing node 102. The method 400 begins with block 402, in which the computing node 102 monitors power consumption of the computing node 102. The computing node 102 may monitor, for example, electrical power consumed (e.g., amps of current or electrical wattage), temperature, cooling capacity used, or any other quantity indicative of the power consumed by the computing node 102. In some embodiments, in block 404, the computing node 102 may determine the per-component power consumption of one or more components of the computing node 102. For example, the computing node 102 may determine the power consumption of the processor 120, the I/O subsystem 122, the memory 124, the data storage device 126, the communication circuitry 128, and/or other components such as a system power supply.

In block 406, the computing node 102 determines whether the power consumption of the computing node 102 is above an optimal level. The computing node 102 may use any appropriate technique to determine whether the current power consumption exceeds the optimal level. The computing node 102 may determine, for example, whether the power consumption exceeds a predetermined threshold. If not above the optimal level, the method 400 loops back to block 402 to continue monitoring power consumption. If the power consumption is above the optimal level, the method 400 advances to block 408.

In block 408, the computing node 102 determines a power requirement associated with a task that may be offloaded to a remote computing node 102. The power requirement may indicate the amount of power required to execute the offloaded task. For example, the power requirement may specify a particular wattage or a relative power requirement (e.g., high, low, or other relative value). In some embodiments, in block 410 the computing node 102 may determine one or more additional compute requirements of the offloaded task. The compute requirements may be embodied as, for example, processor utilization requirements, memory requirements, storage requirements, I/O requirements, and/or any other compute resource required by the offloaded task. The firmware environment 208 of the computing node 102 may determine one or more of the compute requirements by communicating with the operating system 202. For example, the firmware environment 208 may communicate with the operating system 202 to determine processor utilization, memory utilization, storage utilization, I/O utilization, or other requirements of the offloaded task.

In block 412, the computing node 102 broadcasts an offload task request using an out-of-band communication facility of the computing node 102. For example, the computing node 102 may broadcast the offload task request using an out-of-band network capability of the manageability engine 130. The offload task request may include the power requirements of the offloaded task as well as one or more compute requirements (e.g., processor requirements, memory requirements, storage requirements, or I/O requirements). The offload task request may be broadcast to all remote computing nodes 102 in a defined environment such as a data center. The offload task request may be broadcast, for example, to all remote computing nodes 102 in a particular network or subnetwork, to a predefined collection of remote computing nodes 102, or to any other defined environment. In the illustrative embodiment, the offload task request is broadcast using the simple network management protocol (SNMP). However, any appropriate network protocol providing for transport of the offload task request including a payload (e.g. the power requirements and compute requirements) may be used.

In block 414, the computing node 102 receives an offload task acceptance from one or more remote computing nodes 102. The offload task acceptance indicates that the sending remote computing node 102 has capacity to receive the offloaded task. For example, the remote computing node 102 may have power capacity or thermal capacity to execute the offloaded task. In some embodiments, the remote computing node 102 may also have compute capacity for the compute requirements (e.g., processor capacity, memory capacity, storage capacity, or I/O capacity). If offload task acceptances are received from more than one remote computing node 102, the computing node 102 may use any appropriate algorithm to identify a remote computing node 102 to receive the offloaded task. For example, in some embodiments, the computing node 102 may select the first remote computing node 102 to respond with an offload task acceptance. Additionally or alternatively, in some embodiments, the computing node 102 may evaluate one or more metrics supplied by the remote computing nodes 102. For example, the computing node 102 may select the remote computing node 102 having the most available power capacity and/or compute capacity.

In block 416, the computing node 102 commands the operating system 202 to offload the task to the remote computing node 102 identified in block 414. The firmware environment 208 may transmit or otherwise communicate the command to offload the task to the operating system 202.

In some embodiments, in block 418, the computing node 102 may issue the command using a local console of the manageability engine 130.

In block 420, the computing node 102 offloads the task to the remote computing node 102. The operating system 202 may offload the task, for example by removing the task from a task queue and transmitting the task to the remote computing node 102. In some embodiments, in block 422 the computing node 102 may offload the task by sending a task command string to the remote computing node 102. For example, the computing node 102 may send a command string to a remote console of the manageability engine 130 of the remote computing node 102. After offloading the task, the method 400 loops back to block 402 to continue monitoring power consumption.

Figure 5:
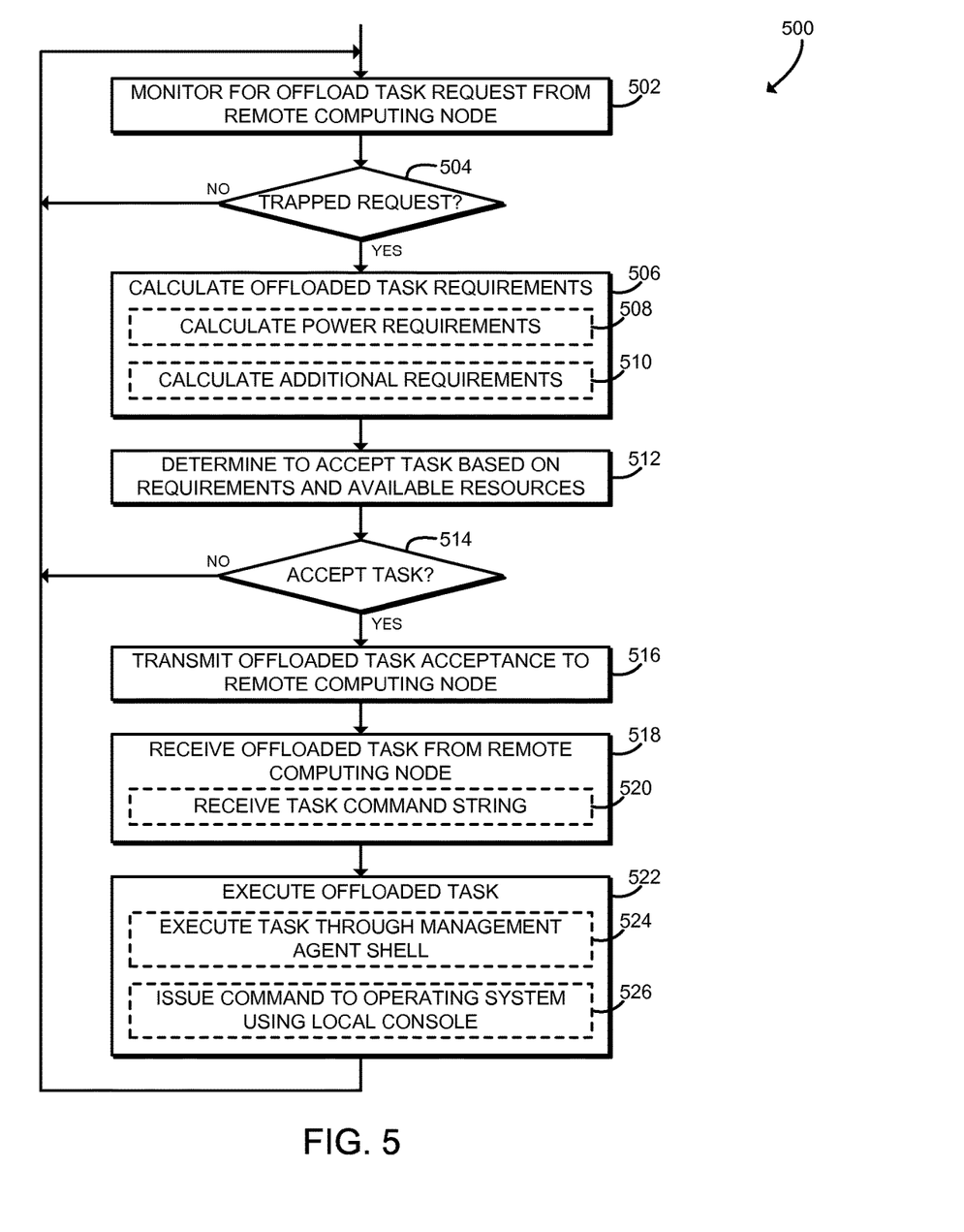
FIG. 5 is a simplified flow diagram of at least one embodiment of a method for accepting offloaded tasks that may be executed by the computing node of FIGS. 1 and 2.

Referring now to FIG. 5, in use, each computing node 102 may execute a method 500 for accepting offloaded tasks. The method 500 is executed by the firmware environment 208; for example by the processor 120 in a UEFI BIOS firmware environment, by the manageability engine 130, or by any other firmware component of the computing node 102. The method 500 begins with block 502, in which the computing node 102 monitors for offload task requests broadcast from a remote computing node 102. The computing node 102 may establish a network listener and attempt to trap any offload task requests broadcast over the network 104. As described above in connection with FIG. 4, the offload task request may be broadcast by the remote computing node 102 in response to the power consumption of the remote computing node 102 exceeding an optimal level. The offload task request may include a power requirement for the task to be offloaded, and in some embodiments may include one or more additional compute requirements (e.g., processor requirements, memory requirements, storage requirements, or I/O requirements). The offload task request may be broadcast using the simple network management protocol (SNMP) or any other appropriate network protocol.

In block 504, the computing node 102 determines whether an offload task request has been trapped. If not, the method 500 loops back to block 502 to continue monitoring for offload task requests. If an offload task request has been trapped, the method 500 advances to block 506.

In block 506, the computing node 102 calculates one or more requirements of the offloaded task. The offloaded task requirements may describe any computing resources, compatible hardware, compatible hardware features, compatible software environments, or other prerequisites required for the computing node 102 to execute the offloaded task. In some embodiments, in block 508 the computing node 102 may calculate power requirements of the offloaded task. For example, the computing node 102 may calculate, predict, or otherwise determine an amount of electrical power required to execute the offloaded task. Similarly, the computing node 102 may calculate the thermal load, cooling requirements, or any other measure indicative of the amount of power used by executing the offloaded task. In some embodiments, in block 510, the computing node 102 may calculate one or more compute requirements of the offloaded task. For example, the computing node 102 may calculate or otherwise predict processor requirements, memory requirements, storage requirements, or I/O requirements of the computing node 102.

In block 512, the computing node 102 determines whether to accept the offloaded task based on the offload task requirements and on the available resources of the computing node 102. For example, the computing node 102 may determine whether power capacity exists for the power requirements of the offloaded task. As another example, the computing node 102 may also consider whether computational capacity exists for one or more compute requirements. For example, in additional to considering power capacity, the computing node 102 may determine if processor capacity exists for the processor requirements of the offloaded task. The computing node 102 may determine not to accept an offload task request if power capacity is available but sufficient processor capacity is not available for the offloaded task. Instead, the computing node 102 may accept an offload task request for a storage-bound task, an I/O-bound task, or another task with lower processor requirements. The computing node 102 may make similar determinations for any other requirements of the offloaded task.

In block 514, the computing node 102 determines whether the offloaded task will be accepted. If not, the method 500 loops back to block 502 to continue monitoring for offload requests. If the offloaded task will be accepted, the method 500 advances to block 516.

In block 516, the computing node 102 transmits an offloaded task acceptance to the remote computing node 102. The offloaded task acceptance indicates that the computing node 102 has capacity to execute the offloaded task based on the offloaded task requirements. The offloaded task acceptance may be transmitted using an out-of-band networking capability of the computing node 102, such as an out-of-band networking capability of the manageability engine 130. In some embodiments, the offloaded task acceptance may also include one or more metrics related to the computing node 102, such as power consumption metrics, processor usage metrics, storage usage metrics, I/O usage metrics, or other metrics. As described above in connection with FIG. 4, the remote computing node 102 may use any technique to determine whether to offload the task in response to receiving the offloaded task acceptance.

In block 518, the computing node 102 receives an offloaded task from the remote computing node 102. The offloaded task may be represented in any appropriate format. The offloaded task may be received using an out-of-band networking capability of the computing node 102, such as an out-of-band networking capability of the manageability engine 130. In some embodiments, in block 520 the computing node 102 may receive the offloaded task by receiving a task command string. For example, the computing node 102 may receive a task command string using a remote console of the manageability engine 130.

In block 522, the computing node 102 executes the offloaded task. The offloaded task may be executed, for example, by being added to a task queue of the operating system 202 and then executed within the operating system 202. In some embodiments, in block 524 the computing node 102 may execute the offloaded task through a management agent shell of the manageability engine 130. In some embodiments, in block 526, the computing node 102 may execute the offloaded task by issuing a command to the operating system 202 using a local console of the manageability engine 130. After starting to execute the offloaded task, the method 500 loops back to block 502 to continue monitoring for additional offload task requests.

EXAMPLES

Illustrative examples of the technologies disclosed herein are provided below. An embodiment of the technologies may include any one or more, and any combination of, the examples described below.

Example 1 includes a computing device for data center power management, the computing device comprising a power management module to (i) determine, in a firmware environment of the computing device, a power consumption value of the computing device and (ii) determine, in the firmware environment, whether the power consumption value of the computing device has a predefined relationship to a threshold power consumption value; an offload request module to (i) broadcast, by the firmware environment using an out-of-band communication facility, an offload task request in response to a determination that the power consumption value has the predefined relationship to the threshold power consumption value and (ii) receive, by the firmware environment, a response from a remote computing device in response to a broadcast of the offload task request, wherein the response indicates that the remote computing device has capacity for an offloaded task; and a task offload module to offload the offloaded task to the remote computing device, wherein the offloaded task is to be executed by the remote computing device.

Example 2 includes the subject matter of Example 1, and wherein to determine the power consumption value comprises to determine a power consumption value for a component of the computing device.

Example 3 includes the subject matter of any of Examples 1 and 2, and wherein to determine whether the power consumption value of the computing device has the predefined relationship to the threshold power consumption value comprises to determine whether the power consumption value exceeds the threshold power consumption value.

Example 4 includes the subject matter of any of Examples 1-3, and wherein the offload request module is further to determine, by the firmware environment, a power requirement of the offload task request in response to the determination that the power consumption value has the predefined relationship to the threshold power consumption value; wherein to broadcast the offload task request comprises to broadcast the power requirement.

Example 5 includes the subject matter of any of Examples 1-4, and wherein the offload request module is further to determine, by the firmware environment, a compute requirement of the offload task request in response to the determination that the power consumption value has the predefined relationship to the threshold power consumption value; wherein to broadcast the offload task request further comprises to broadcast the compute requirement.

Example 6 includes the subject matter of any of Examples 1-5, and wherein the compute requirement comprises a processor requirement, a memory requirement, a storage requirement, or an I/O requirement.

Example 7 includes the subject matter of any of Examples 1-6, and wherein to broadcast the offload task request comprises to transmit the offload task request via a simple network management protocol (SNMP).

Example 8 includes the subject matter of any of Examples 1-7, and wherein to broadcast the offload task request comprises to broadcast the offload task request to a network or a sub-network.

Example 9 includes the subject matter of any of Examples 1-8, and wherein to broadcast the offload task request comprises to broadcast the offload task request to a predefined collection of remote computing devices.

Example 10 includes the subject matter of any of Examples 1-9, and wherein the offload request module is further to transmit, by the firmware environment, a command to offload the offloaded task to an operating system of the computing device in response to receipt of the response from the remote computing device; wherein to offload the offloaded task comprises to offload the offloaded task by the operating system in response to transmission of the command to the operating system.

Example 11 includes the subject matter of any of Examples 1-10, and wherein to offload the offloaded task to the remote computing device comprises to transmit a command string to the remote computing device.

Example 12 includes the subject matter of any of Examples 1-11, and wherein to offload the offloaded task to the remote computing device further comprises to transmit the command string to a remote console of a firmware environment of the remote computing device.

Example 13 includes the subject matter of any of Examples 1-12, and further including a manageability engine to establish the firmware environment.

Example 14 includes the subject matter of any of Examples 1-13, and further including an offload accept module to receive, by the firmware environment via the out-of-band communication facility, a second offload task request broadcast from a second remote computing device; determine, by the firmware environment, a power requirement of the second offload task request; determine, by the firmware environment, whether to accept the second offload task request based on the power requirement of the second offload task request and available resources of the computing device; transmit, by the firmware environment, an offload task acceptance to the second remote computing device in response to a determination to accept the second offload task request; and receive, by the firmware environment, a second offloaded task from the second remote computing device in response to transmission of the offload task acceptance; wherein the task offload module is further to execute the second offloaded task in response to receipt of the second offloaded task.

Example 15 includes a computing device for data center power management, the computing device comprising an offload accept module to receive, by a firmware environment of the computing device via an out-of-band communication facility, an offload task request broadcast from a remote computing device; determine, by the firmware environment, a power requirement of the offload task request; determine, by the firmware environment, whether to accept the offload task request based on the power requirement of the offload task request and available resources of the computing device; transmit, by the firmware environment, an offload task acceptance to the remote computing device in response to a determination to accept the offload task request; and receive, by the firmware environment, an offloaded task from the remote computing device in response to transmission of the offload task acceptance; and a task offload module to execute the offloaded task in response to receipt of the offloaded task.

Example 16 includes the subject matter of Example 15, and wherein to determine whether to accept the offload task comprises to determine a power consumption value of the computing device.

Example 17 includes the subject matter of any of Examples 15 and 16, and wherein to determine whether to accept the offload task request comprises to determine a power consumption value of a component of the computing device.

Example 18 includes the subject matter of any of Examples 15-17, and wherein the offload accept module is further to determine, by the firmware environment, a compute requirement of the offload task request; wherein to determine whether to accept the offload task request further comprises to determine whether to accept the offload task request based on the compute requirement of the offload task request and the available resources of the computing device.

Example 19 includes the subject matter of any of Examples 15-18, and wherein the compute requirement comprises a processor requirement, a memory requirement, a storage requirement, or an I/O requirement.

Example 20 includes the subject matter of any of Examples 15-19, and wherein to receive the offloaded task comprises to receive a command string from the remote computing device.

Example 21 includes the subject matter of any of Examples 15-20, and wherein to execute the offloaded task comprises to execute the command string using a management shell of the firmware environment.

Example 22 includes the subject matter of any of Examples 15-21, and wherein to execute the offloaded task comprises to issue a command from the firmware environment to an operating system of the computing device.

Example 23 includes the subject matter of any of Examples 15-22, and further including a manageability engine to establish the firmware environment.

Example 24 includes the subject matter of any of Examples 15-23, and further including a power management module to (i) determine, by the firmware environment, a power consumption value of the computing device and (ii) determine, by the firmware environment, whether the power consumption value of the computing device has a predefined relationship to a threshold power consumption value; and an offload request module to: (i) broadcast, by the firmware environment using the out-of-band communication facility, a second offload task request in response to a determination that the power consumption value has the predefined relationship to the threshold power consumption value and (ii) receive, by the firmware environment, a response from a second remote computing device in response to a broadcast of the second offload task request, wherein the response indicates that the second remote computing device has capacity for a second offloaded task; wherein the task offload module is further to offload the second offloaded task to the second remote computing device, wherein the second offloaded task is to be executed by the second remote computing device.

Example 25 includes a method for data center power management, the method comprising determining, by a firmware environment of a computing device, a power consumption value of the computing device; determining, by the firmware environment, whether the power consumption value of the computing device has a predefined relationship to a threshold power consumption value; broadcasting, by the firmware environment using an out-of-band communication facility, an offload task request in response to determining the power consumption value has the predefined relationship to the threshold power consumption value; receiving, by the firmware environment, a response from a remote computing device in response to broadcasting the offload task request, wherein the response indicates that the remote computing device has capacity for an offloaded task; and offloading, by the computing device, the offloaded task to the remote computing device, wherein the offloaded task is to be executed by the remote computing device.

Example 26 includes the subject matter of Example 25, and wherein determining the power consumption value comprises determining a power consumption value for a component of the computing device.

Example 27 includes the subject matter of any of Examples 25 and 26, and wherein determining whether the power consumption value of the computing device has the predefined relationship to the threshold power consumption value comprises determining whether the power consumption value exceeds the threshold power consumption value.

Example 28 includes the subject matter of any of Examples 25-27, and further including determining, by the firmware environment, a power requirement of the offload task request in response to determining the power consumption value has the predefined relationship to the threshold power consumption value; wherein broadcasting the offload task request comprises broadcasting the power requirement.

Example 29 includes the subject matter of any of Examples 25-28, and further including determining, by the firmware environment, a compute requirement of the offload task request in response to determining the power consumption value has the predefined relationship to the threshold power consumption value; wherein broadcasting the offload task request further comprises broadcasting the compute requirement.

Example 30 includes the subject matter of any of Examples 25-29, and wherein the compute requirement comprises a processor requirement, a memory requirement, a storage requirement, or an I/O requirement.

Example 31 includes the subject matter of any of Examples 25-30, and wherein broadcasting the offload task request comprises transmitting the offload task request via a simple network management protocol (SNMP).

Example 32 includes the subject matter of any of Examples 25-31, and wherein broadcasting the offload task request comprises broadcasting the offload task request to a network or a sub-network.

Example 33 includes the subject matter of any of Examples 25-32, and wherein broadcasting the offload task request comprises broadcasting the offload task request to a predefined collection of remote computing devices.

Example 34 includes the subject matter of any of Examples 25-33, and further including transmitting, by the firmware environment, a command to offload the offloaded task to an operating system of the computing device in response to receiving the response from the remote computing device; wherein offloading the offloaded task comprises offloading the offloaded task by the operating system in response to transmitting the command to the operating system.

Example 35 includes the subject matter of any of Examples 25-34, and wherein offloading the offloaded task to the remote computing device comprises transmitting a command string to the remote computing device.

Example 36 includes the subject matter of any of Examples 25-35, and wherein offloading the offloaded task to the remote computing device further comprises transmitting the command string to a remote console of a firmware environment of the remote computing device.

Example 37 includes the subject matter of any of Examples 25-36, and wherein the firmware environment is established by a manageability engine of the computing device.

Example 38 includes the subject matter of any of Examples 25-37, and further including receiving, by the firmware environment via the out-of-band communication facility, a second offload task request broadcast from a second remote computing device; determining, by the firmware environment, a power requirement of the second offload task request; determining, by the firmware environment, whether to accept the second offload task request based on the power requirement of the second offload task request and available resources of the computing device;

transmitting, by the firmware environment, an offload task acceptance to the second remote computing device in response to determining to accept the second offload task request; receiving, by the firmware environment, a second offloaded task from the second remote computing device in response to transmitting the offload task acceptance; and executing, by the computing device, the second offloaded task in response to receiving the second offloaded task.

Example 39 includes a method for data center power management, the method comprising receiving, by a firmware environment of a computing device via an out-of-band communication facility, an offload task request broadcast from a remote computing device; determining, by the firmware environment, a power requirement of the offload task request; determining, by the firmware environment, whether to accept the offload task request based on the power requirement of the offload task request and available resources of the computing device; transmitting, by the firmware environment, an offload task acceptance to the remote computing device in response to determining to accept the offload task request; receiving, by the firmware environment, an offloaded task from the remote computing device in response to transmitting the offload task acceptance; and executing, by the computing device, the offloaded task in response to receiving the offloaded task.

Example 40 includes the subject matter of Example 39, and wherein determining whether to accept the offload task comprises determining a power consumption value of the computing device.

Example 41 includes the subject matter of any of Examples 39 and 40, and wherein determining whether to accept the offload task request comprises determining a power consumption value of a component of the computing device.

Example 42 includes the subject matter of any of Examples 39-41, and further including determining, by the firmware environment, a compute requirement of the offload task request; wherein determining whether to accept the offload task request further comprises determining whether to accept the offload task request based on the compute requirement of the offload task request and the available resources of the computing device.

Example 43 includes the subject matter of any of Examples 39-42, and wherein the compute requirement comprises a processor requirement, a memory requirement, a storage requirement, or an I/O requirement.

Example 44 includes the subject matter of any of Examples 39-43, and wherein receiving the offloaded task comprises receiving a command string from the remote computing device.

Example 45 includes the subject matter of any of Examples 39-44, and wherein executing the offloaded task comprises executing the command string using a management shell of the firmware environment.

Example 46 includes the subject matter of any of Examples 39-45, and wherein executing the offloaded task comprises issuing a command from the firmware environment to an operating system of the computing device.

Example 47 includes the subject matter of any of Examples 39-46, and wherein the firmware environment is established by a manageability engine of the computing device.

Example 48 includes the subject matter of any of Examples 39-47, and further including determining, by the firmware environment, a power consumption value of the computing device; determining, by the firmware environment, whether the power consumption value of the computing device has a predefined relationship to a threshold power consumption value; broadcasting, by the firmware environment using the out-of-band communication facility, a second offload task request in response to determining the power consumption value has the predefined relationship to the threshold power consumption value; receiving, by the firmware environment, a response from a second remote computing device in response to broadcasting the second offload task request, wherein the response indicates that the second remote computing device has capacity for a second offloaded task; and offloading, by the computing device, the second offloaded task to the second remote computing device, wherein the second offloaded task is to be executed by the second remote computing device.

Example 49 includes a computing device comprising a processor; and a memory having stored therein a plurality of instructions that when executed by the processor cause the computing device to perform the method of any of Examples 25-48.

Example 50 includes one or more machine readable storage media comprising a plurality of instructions stored thereon that in response to being executed result in a computing device performing the method of any of Examples 25-48.

Example 51 includes a computing device comprising means for performing the method of any of Examples 25-48.

Example 52 includes a computing device for data center power management, the computing device comprising means for determining, by a firmware environment of the computing device, a power consumption value of the computing device; means for determining, by the firmware environment, whether the power consumption value of the computing device has a predefined relationship to a threshold power consumption value; means for broadcasting, by the firmware environment using an out-of-band communication facility, an offload task request in response to determining the power consumption value has the predefined relationship to the threshold power consumption value; means for receiving, by the firmware environment, a response from a remote computing device in response to broadcasting the offload task request, wherein the response indicates that the remote computing device has capacity for an offloaded task; and means for offloading the offloaded task to the remote computing device, wherein the offloaded task is to be executed by the remote computing device.

Example 53 includes the subject matter of Example 52, and wherein the means for determining the power consumption value comprises means for determining a power consumption value for a component of the computing device.

Example 54 includes the subject matter of any of Examples 52 and 53, and wherein the means for determining whether the power consumption value of the computing device has the predefined relationship to the threshold power consumption value comprises means for determining whether the power consumption value exceeds the threshold power consumption value.

Example 55 includes the subject matter of any of Examples 52-54, and further including means for determining, by the firmware environment, a power requirement of the offload task request in response to determining the power consumption value has the predefined relationship to the threshold power consumption value; wherein the means for broadcasting the offload task request comprises means for broadcasting the power requirement.

Example 56 includes the subject matter of any of Examples 52-55, and further including means for determining, by the firmware environment, a compute requirement of the offload task request in response to determining the power consumption value has the predefined relationship to the threshold power consumption value; wherein the means for broadcasting the offload task request further comprises means for broadcasting the compute requirement.

Example 57 includes the subject matter of any of Examples 52-56, and wherein the compute requirement comprises a processor requirement, a memory requirement, a storage requirement, or an I/O requirement.

Example 58 includes the subject matter of any of Examples 52-57, and wherein the means for broadcasting the offload task request comprises means for transmitting the offload task request via a simple network management protocol (SNMP).

Example 59 includes the subject matter of any of Examples 52-58, and wherein the means for broadcasting the offload task request comprises means for broadcasting the offload task request to a network or a sub-network.

Example 60 includes the subject matter of any of Examples 52-59, and wherein the means for broadcasting the offload task request comprises means for broadcasting the offload task request to a predefined collection of remote computing devices.

Example 61 includes the subject matter of any of Examples 52-60, and further including means for transmitting, by the firmware environment, a command to offload the offloaded task to an operating system of the computing device in response to receiving the response from the remote computing device; wherein the means for offloading the offloaded task comprises means for offloading the offloaded task by the operating system in response to transmitting the command to the operating system.

Example 62 includes the subject matter of any of Examples 52-61, and wherein the means for offloading the offloaded task to the remote computing device comprises means for transmitting a command string to the remote computing device.

Example 63 includes the subject matter of any of Examples 52-62, and wherein the means for offloading the offloaded task to the remote computing device further comprises means for transmitting the command string to a remote console of a firmware environment of the remote computing device.

Example 64 includes the subject matter of any of Examples 52-63, and wherein the firmware environment is established by a manageability engine of the computing device.

Example 65 includes the subject matter of any of Examples 52-64, and further including means for receiving, by the firmware environment via the out-of-band communication facility, a second offload task request broadcast from a second remote computing device; means for determining, by the firmware environment, a power requirement of the second offload task request; means for determining, by the firmware environment, whether to accept the second offload task request based on the power requirement of the second offload task request and available resources of the computing device; means for transmitting, by the firmware environment, an offload task acceptance to the second remote computing device in response to determining to accept the second offload task request; means for receiving, by the firmware environment, a second offloaded task from the second remote computing device in response to transmitting the offload task acceptance; and means for executing the second offloaded task in response to receiving the second offloaded task.

Example 66 includes a computing device for data center power management, the computing device comprising means for receiving, by a firmware environment of the computing device via an out-of-band communication facility, an offload task request broadcast from a remote computing device; means for determining, by the firmware environment, a power requirement of the offload task request; means for determining, by the firmware environment, whether to accept the offload task request based on the power requirement of the offload task request and available resources of the computing device; means for transmitting, by the firmware environment, an offload task acceptance to the remote computing device in response to determining to accept the offload task request; means for receiving, by the firmware environment, an offloaded task from the remote computing device in response to transmitting the offload task acceptance; and means for executing the offloaded task in response to receiving the offloaded task.

Example 67 includes the subject matter of Example 66, and wherein the means for determining whether to accept the offload task comprises means for determining a power consumption value of the computing device.

Example 68 includes the subject matter of any of Examples 66 and 67, and wherein the means for determining whether to accept the offload task request comprises means for determining a power consumption value of a component of the computing device.

Example 69 includes the subject matter of any of Examples 66-68, and further including means for determining, by the firmware environment, a compute requirement of the offload task request; wherein the means for determining whether to accept the offload task request further comprises means for determining whether to accept the offload task request based on the compute requirement of the offload task request and the available resources of the computing device.

Example 70 includes the subject matter of any of Examples 66-69, and wherein the compute requirement comprises a processor requirement, a memory requirement, a storage requirement, or an I/O requirement.

Example 71 includes the subject matter of any of Examples 66-70, and wherein the means for receiving the offloaded task comprises means for receiving a command string from the remote computing device.

Example 72 includes the subject matter of any of Examples 66-71, and wherein the means for executing the offloaded task comprises means for executing the command string using a management shell of the firmware environment.

Example 73 includes the subject matter of any of Examples 66-72, and wherein the means for executing the offloaded task comprises means for issuing a command from the firmware environment to an operating system of the computing device.

Example 74 includes the subject matter of any of Examples 66-73, and wherein the firmware environment is established by a manageability engine of the computing device.

Example 75 includes the subject matter of any of Examples 66-74, and further including means for determining, by the firmware environment, a power consumption value of the computing device; means for determining, by the firmware environment, whether the power consumption value of the computing device has a predefined relationship to a threshold power consumption value; means for broadcasting, by the firmware environment using the out-of-band communication facility, a second offload task request in response to determining the power consumption value has the predefined relationship to the threshold power consumption value; means for receiving, by the firmware environment, a response from a second remote computing device in response to broadcasting the second offload task request, wherein the response indicates that the second remote computing device has capacity for a second offloaded task; and means for offloading the second offloaded task to the second remote computing device, wherein the second offloaded task is to be executed by the second remote computing device.

The invention claimed is:

1. A computing device for data center power management, the computing device comprising:
a memory; and
one or more processors to:
determine, in a firmware environment of the computing device, a power consumption value of the computing device;
determine, in the firmware environment, whether the power consumption value of the computing device has a predefined relationship to a threshold power consumption value;
broadcast, by the firmware environment using an out-of-band communication facility, an offload task request in response to a determination that the power consumption value has the predefined relationship to the threshold power consumption value;
receive, by the firmware environment, a response from a remote computing device in response to a broadcast of the offload task request, wherein the response indicates that the remote computing device has capacity for an offloaded task; and
offload the offloaded task to the remote computing device, wherein the offloaded task is to be executed by the remote computing device.

2. The computing device of claim 1, wherein to determine the power consumption value comprises to determine a power consumption value for a component of the computing device.

3. The computing device of claim 1, wherein the one or more processors are further to:
determine, by the firmware environment, a power requirement of the offload task request in response to the determination that the power consumption value has the predefined relationship to the threshold power consumption value;
wherein to broadcast the offload task request comprises to broadcast the power requirement.

4. The computing device of claim 3, wherein the one or more processors are further to:
determine, by the firmware environment, a compute requirement of the offload task request in response to the determination that the power consumption value has the predefined relationship to the threshold power consumption value;
wherein to broadcast the offload task request further comprises to broadcast the compute requirement.

5. The computing device of claim 1, wherein to offload the offloaded task to the remote computing device comprises to transmit a command string to the remote computing device.

6. The computing device of claim 5, wherein to offload the offloaded task to the remote computing device further comprises to transmit the command string to a remote console of a firmware environment of the remote computing device.

7. The computing device of claim 1, wherein the one or more processors comprises a manageability engine to establish the firmware environment.

8. The computing device of claim 1, wherein the one or more processors are further to:
receive, by the firmware environment via the out-of-band communication facility, a second offload task request broadcast from a second remote computing device;
determine, by the firmware environment, a power requirement of the second offload task request;
determine, by the firmware environment, whether to accept the second offload task request based on the power requirement of the second offload task request and available resources of the computing device;
transmit, by the firmware environment, an offload task acceptance to the second remote computing device in response to a determination to accept the second offload task request;
receive, by the firmware environment, a second offloaded task from the second remote computing device in response to transmission of the offload task acceptance; and
execute the second offloaded task in response to receipt of the second offloaded task.

9. One or more non-transitory computer-readable storage media comprising a plurality of instructions that in response to being executed cause a computing device to:
determine, by a firmware environment of the computing device, a power consumption value of the computing device;
determine, by the firmware environment, whether the power consumption value of the computing device has a predefined relationship to a threshold power consumption value;
broadcast, by the firmware environment using an out-of-band communication facility, an offload task request in response to determining the power consumption value has the predefined relationship to the threshold power consumption value;
receive, by the firmware environment, a response from a remote computing device in response to broadcasting the offload task request, wherein the response indicates that the remote computing device has capacity for an offloaded task; and
offload the offloaded task to the remote computing device, wherein the offloaded task is to be executed by the remote computing device.

10. The one or more non-transitory computer-readable storage media of claim 9, wherein to determine the power consumption value comprises to determine a power consumption value for a component of the computing device.

11. The one or more non-transitory computer-readable storage media of claim 9, further comprising a plurality of instructions that in response to being executed cause the computing device to:
determine, by the firmware environment, a power requirement of the offload task request in response to determining the power consumption value has the predefined relationship to the threshold power consumption value;
wherein to broadcast the offload task request comprises to broadcast the power requirement.

12. The one or more non-transitory computer-readable storage media of claim 11, further comprising a plurality of instructions that in response to being executed cause the computing device to:
determine, by the firmware environment, a compute requirement of the offload task request in response to determining the power consumption value has the predefined relationship to the threshold power consumption value;
wherein to broadcast the offload task request further comprises to broadcast the compute requirement.

13. The one or more non-transitory computer-readable storage media of claim 9, wherein the firmware environment is established by a manageability engine of the computing device.

14. The one or more non-transitory computer-readable storage media of claim 9, further comprising a plurality of instructions that in response to being executed cause the computing device to:
receive, by the firmware environment via the out-of-band communication facility, a second offload task request broadcast from a second remote computing device;
determine, by the firmware environment, a power requirement of the second offload task request;
determine, by the firmware environment, whether to accept the second offload task request based on the power requirement of the second offload task request and available resources of the computing device;
transmit, by the firmware environment, an offload task acceptance to the second remote computing device in response to determining to accept the second offload task request;
receive, by the firmware environment, a second offloaded task from the second remote computing device in response to transmitting the offload task acceptance; and
execute the second offloaded task in response to receiving the second offloaded task.

15. A computing device for data center power management, the computing device comprising:
a memory;
one or more processors to:
receive, by a firmware environment of the computing device via an out-of-band communication facility, an offload task request broadcast from a remote computing device;
determine, by the firmware environment, a power requirement of the offload task request;
determine, by the firmware environment, whether to accept the offload task request based on the power requirement of the offload task request and available resources of the computing device;
transmit, by the firmware environment, an offload task acceptance to the remote computing device in response to a determination to accept the offload task request;
receive, by the firmware environment, an offloaded task from the remote computing device in response to transmission of the offload task acceptance; and
execute the offloaded task in response to receipt of the offloaded task.

16. The computing device of claim 15, wherein to determine whether to accept the offload task request comprises to determine a power consumption value of a component of the computing device.

17. The computing device of claim 15, wherein:
the one or more processors are further to determine, by the firmware environment, a compute requirement of the offload task request; and
to determine whether to accept the offload task request further comprises to determine whether to accept the offload task request based on the compute requirement of the offload task request and the available resources of the computing device.

18. The computing device of claim 15, wherein to receive the offloaded task comprises to receive a command string from the remote computing device.

19. The computing device of claim 18, wherein to execute the offloaded task comprises to execute the command string using a management shell of the firmware environment.

20. The computing device of claim 15, wherein the one or more processors comprises a manageability engine to establish the firmware environment.

21. One or more non-transitory computer-readable storage media comprising a plurality of instructions that in response to being executed cause a computing device to:
receive, by a firmware environment of the computing device via an out-of-band communication facility, an offload task request broadcast from a remote computing device;
determine, by the firmware environment, a power requirement of the offload task request;
determine, by the firmware environment, whether to accept the offload task request based on the power requirement of the offload task request and available resources of the computing device;
transmit, by the firmware environment, an offload task acceptance to the remote computing device in response to determining to accept the offload task request;
receive, by the firmware environment, an offloaded task from the remote computing device in response to transmitting the offload task acceptance; and
execute the offloaded task in response to receiving the offloaded task.

22. The one or more non-transitory computer-readable storage media of claim 21, wherein to determine whether to accept the offload task request comprises to determine a power consumption value of a component of the computing device.

23. The one or more non-transitory computer-readable storage media of claim 21, further comprising a plurality of instructions that in response to being executed cause the computing device to:
determine, by the firmware environment, a compute requirement of the offload task request;
wherein to determine whether to accept the offload task request further comprises to determine whether to accept the offload task request based on the compute requirement of the offload task request and the available resources of the computing device.

24. The one or more non-transitory computer-readable storage media of claim 21, wherein the firmware environment is established by a manageability engine of the computing device.

* * * * *